June 23, 1936.  J. O. ALMEN  2,045,555
MEANS FOR TESTING LUBRICANTS
Filed Feb. 17, 1933
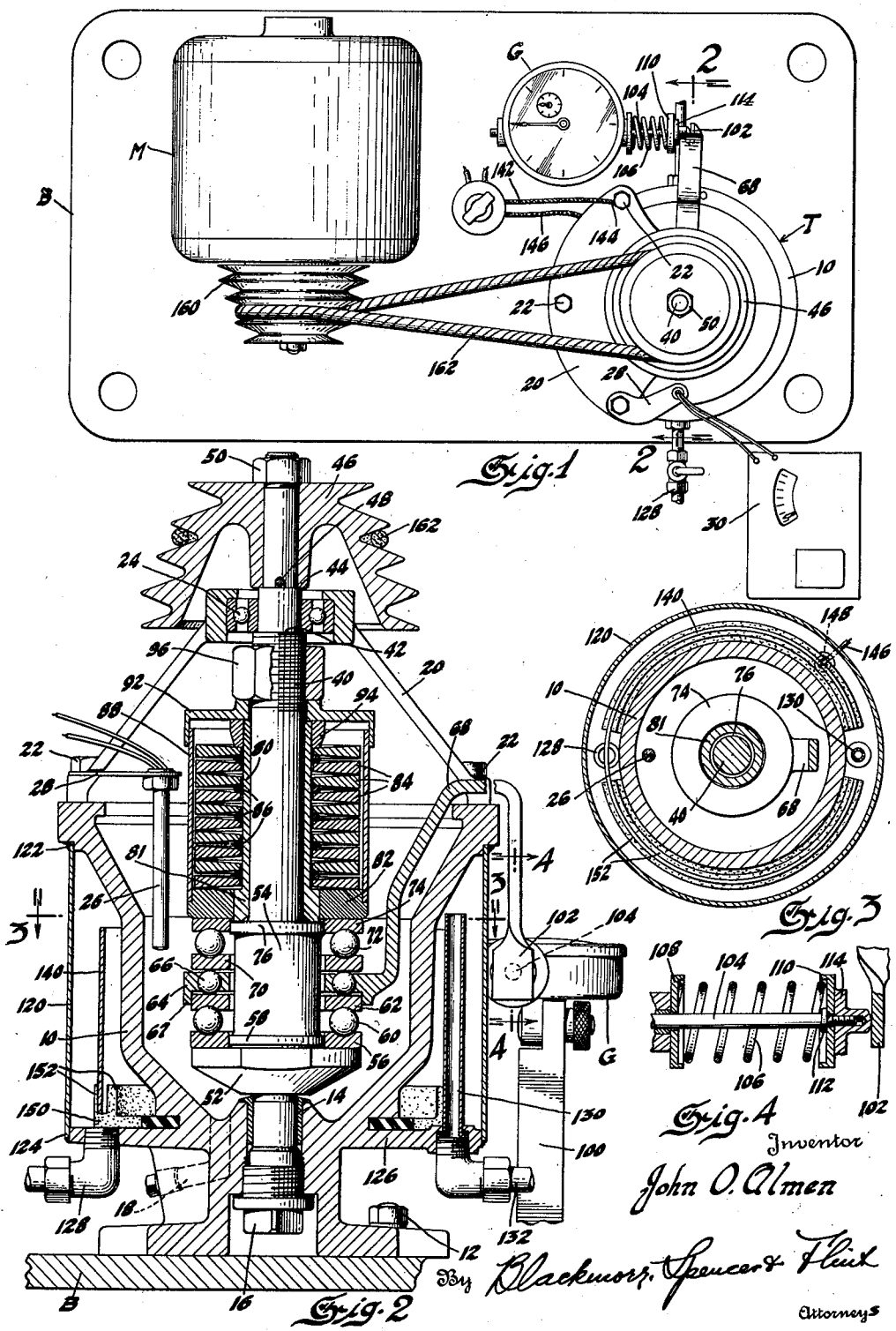
Inventor
John O. Almen
By Blackmore, Spencer & Flint
Attorneys Patented June 23, 1936

2,045,555

UNITED STATES PATENT OFFICE 2,045,555

MEANS FOR TESTING LUBRICANTS

John O. Almen, Royal Oak, Mich., assignor, by mesne assignments, to General Motors Corporation, Detroit, Mich., a corporation of Delaware Application February 17, 1933, Serial No. 657,212

3 Claims. (Cl. 265—10)

The invention disclosed and claimed herein relates to apparatus for testing the availability of various oily substances for lubricating and other purposes in friction transmission mechanism of the types shown by way of example in United States patents to Erban #1,774,175, Ehrlich et al. #1,844,464 and others.

Transmission mechanism of the type referred to comprise hard surfaced races and interposed rollers forced into tractive engagement under high pressures in order to secure adequate traction under all operating conditions encountered. In this type of transmission, the rollers, although in driving contact with the races over extremely small areas,—points theoretically,—when under no substantial pressure, yet deform under the pressures necessary to secure good driving contact when transmitting considerable torque and therefore have then measurable areas of contact.

In friction transmission mechanisms composed of toric races and rollers having spheroidal or other surfaces curved in two planes, as shown in the exemplary patents mentioned, the areas of contact between rollers and races under the traction-securing pressures used in practice are ellipses of considerable eccentricity. As the paths of the rollers on the races are circular during normal operation, it is obvious that the rollers are constantly changing direction, rolling relatively to the races in circles instead of in straight lines, so that there is a continual turning movement of this elliptical contact area of the rollers and races during operation such that the area of contact of a roller makes one complete turn on the race surface with each complete rotation of the contacting race or each complete revolution of the roller about the race axis. This turning movement of roller on race, referred to in the art generally as "spinning", creates sliding friction between race and roller. Of course different points in the contact area have different spinning velocities depending on their distances from the spinning axis, and the pressure varies at different points.

Although best tractive adhesion between races and rollers might be obtained by direct metal to metal contact in the absence of any lubricant, yet without some oily cooling substance on the contacting surfaces high heat is developed by the spinning friction and the surfaces of races and rollers are subject to scoring or galling resulting in speedy destruction of races or rollers or both as practical transmission elements.

It therefore appears necessary to apply to the contacting surfaces of races and rollers of the type under consideration some oily cooling liquid that is capable of reducing friction due to spinning and yet affords sufficient adhesion between the surfaces to transmit power with a minimum of slip at the axis of spinning or theoretical point of contact between each race and roller and it is an object of this invention to ascertain whether any liquid contemplated for use in friction transmission mechanisms of the type referred to has the property of satisfactorily lubricating and cooling the surfaces in rubbing contact and at the same time affording such a degree of adhesion that the races and rollers can transmit power without substantial slippage at the theoretical point of contact.

The invention consists in an apparatus comprising races and rollers that can be operated at predetermined speeds and normal loads between the rollers and races, while immersed in oil or like liquid to be tested, with means for maintaining the liquid at a predetermined temperature (all in simulation of the structure and operating conditions of friction transmissions of the type referred to) together with a means movable against yielding resistance in proportion to the amount of friction between rollers and races, and operatively connected to a torque measuring device. The elements used for simulating races and rollers of a transmission mechanism herein specifically disclosed are standard ball thrust bearings readily obtainable at low cost, easily replaceable and satisfactory for this purpose.

In the accompanying drawing in which like reference characters indicate the same parts throughout the several views:

Figure 1 is a plan view of an apparatus embodying the invention;

Figure 2 is a view in section in a plane indicated by line 2—2 of Figure 1;

Figure 3 is a view in horizontal section in a plane indicated by line 3—3 in Figure 2, and Figure 4 is a view in section in a vertical plane indicated by line 4—4 in Figure 2.

Reference letter B indicates a base plate which supports a motor M, a testing apparatus indicated as a whole by T, and a torque measuring instrument indicated by G. The motor, testing apparatus and torque measuring instrument are interconnected as shown, the motor rotating the shaft of the testing apparatus and the instrument G measuring the friction force exerted between balls and races by means of a device that moves in accordance with the friction losses during operation of the test elements to be described.

The testing apparatus includes a container in which a vertical shaft and testing elements operated thereby are rotatably mounted. The container of the testing apparatus is indicated by numeral 10 and is adapted to hold a quantity of liquid, such as oil, in contact with the testing elements.

The upper part of container 10 flares outward and a flange 126 of a diameter approximately equal to that of the rim extends from the lower part thereof. The container is shown as secured to base B by bolts 12 passing through a foot flange. At the bottom is a bearing formed by a vertical central opening bushed at 14 to receive the lower end of the shaft, which is stepped upon the end of a suitable supporting plug 16 threaded into the opening. Oil or other liquid to be tested may be poured or otherwise placed in the container and be drawn off thru the outlet 18 provided with a valve or removable plug. An uprising cone-like sector shell 20 is secured to the rim of container 10, as by bolts 22. The apex of the shell 20 is formed into a seat for holding a ball bearing 24 for guiding the upper portion of the shaft. A thermo-couple 26 supported by a bracket 28 secured to the base of cone-like sector shell 20 may be utilized to measure the temperature of the liquid contents of the container. The thermo-couple is shown electrically connected with a potentiometer 30. A suitable thermometer may, however, be used in place of the thermo-couple if desired.

The vertical shaft of the test apparatus is indicated at 40, its lower end resting in the step bearing upon the plug 16, the upper portion being guided in ball bearing 24, the inner race of which, fitted on the shaft, rests against a shoulder 42. Above the bearing 24 the shaft is further reduced to form a shoulder 44. A cone pulley 46 is sleeved over the reduced upper end of the shaft, rests upon shoulder 44 and is suitably secured to the shaft as shown by pin 48 and nut 50. Just above the step bearing at its lower end shaft 40 carries a strong abutment 52 which may be preferably integral with the shaft and above the abutment is a spool-like formation 54, also preferably integral with the shaft, of a diameter intermediate that of the abutment 52 and the body of the shaft between it and the shoulder 42. A thrust bearing race ring 56 rests upon abutment 52 surrounding closely the lower flange 58 of the spool-like body 54. Resting upon race ring 56 is a series of bearing balls 60 and resting upon bearing balls 60 is an upper race ring 62, free of the body 54 by the amount of radial projection of the flange 58 from the body. Just above race ring 62 is a device 64 consisting of a ring-like member, flanged at 67, provided with a plurality of ball seats retaining a series of balls 66 resting on race 62. The central opening of the flanged member 64 is also larger in diameter than the body 54 and the flange 67 fits over the race 62 as shown. Rigid with the device 64 is an arm 68 which extends upward and outward over the rim of container 10 and serves to transmit rotary movement of the member 64 to the torque measuring device. A race ring 70, of the same size and character as race ring 62, rests on top of balls 66 and supports a series of balls 72 identical with balls 60. Above the balls 72 is a race ring 74 identical in size and function with race ring 56 and hugging flange 76 of body 54. It will be perceived that the described assembly consists of two ball thrust bearings with an interposed device 64 capable of angular movement in accordance with the friction losses between balls and races due to spinning.

Sleeved on shaft 40 above the flange 76 of body 54 is a slidable sleeve 80 having a slightly expanded foot piece 81 integral with its lower end and resting upon the flange 76. A strong ring 82 surrounds the foot piece 81 and rests upon the upper race 74. A plurality of springs 84 of Belleville washer type are, with round wire separators 86, telescoped over sleeve 80, the lower spring washer bearing upon the upper side of strong ring 82. The spring washers are enclosed by a cylinder 88 fitted to ring 82 as shown. A flanged cap 92 slidably sleeved on shaft 40 telescopes with cylinder 88. Cap 92 is thickened and strengthened at its center. Between the cap and the upper spring washer is disposed a thrust ring 94 arranged to telescope with sleeve 80, and bear upon top washer 84 at its inner zone. A nut 96 threaded on the shaft above the cap 92 is adapted to force the cap 92 and thrust ring 94 downward, compress the spring washers and thus apply a predetermined quantity of force to the spring washer assembly thru the ring 82 in order to load the races, balls and member 64 to the extent desired.

Sleeve 80, cap 92, races 56 and 74 all rotate with the shaft due to the high coefficient of friction between them and the shaft as compared with the relatively low coefficient of friction between the balls, races and member 64.

Torque measuring instrument G is shown supported on a standard 100, which rises from base B adjacent the container 10 in position near the end of arm 68 of the member 64. This arm extends over the edge of container 10 downward, as shown in Figure 2, terminating in a flattened pressure element 102 adapted to bear against a cap nut 114 screwed to the operating staff 104 of instrument G. In this embodiment, an accurately calibrated compression spring 106 surrounds staff 104 bearing between an abutment seat 108 on the casing of the gauge and a similar seat 110 secured to the outer end of staff 104 between a shoulder 112 and nut 114.

In order to heat and regulate the degree of heat of the oil or other liquid to be tested container 10 is water-jacketed by means of a cylindrical envelope 120 having its upper edge 122 seated in a rabbet on the underside of the flanged rim of the container and welded, soldered or otherwise secured, and its lower edge 124 welded, soldered or otherwise fastened to the edge of flange 126 which constitutes the bottom of the water jacket space. An inlet for water is provided at 128. An overflow pipe 130, diametrically opposite the inlet, communicates with a drain pipe 132 to keep the water at a desired level. In the illustrated embodiment the water may be heated by an electrical resistance heater element consisting of a curved sheet of suitable conductive material, indicated by numeral 140, in circuit with a suitable source of electric power not shown, one conductor wire 142 being shown connected to ground at 144 (Figure 1) and the other wire 146 being connected to the heater element 140 as indicated at 148 in Figure 3. In order to insulate the heater element from the container a circular support 150 of Bakelite or other suitable insulating material rests on the bottom of the water space. This insulator has spaced flanges 152 receiving between them the lower edge of the heater element. Where the inlet and overflow pipes are located the insulating ring is cut away, as shown in Figure 3. The heater unit is not continuous,—lacking the form of a cylinder by a gap wide enough to admit and insulate it from the overflow pipe 130 as shown in Figures 2 and 3.

Grooved cone pulley 46 on shaft 40 may be driven from grooved cone pulley 160 secured to the armature shaft of motor M by a belt 162, and thus by shifting the belt from one pair of grooves to another the speed ratio may be changed at will.

In running a test, container 10 is charged with the oil or other liquid to be tested to a depth sufficient to supply the liquid constantly to the contacting surfaces of the races and balls of the test assembly. The desired pressure, say 2,000 pounds, is applied to the test assembly by clamping it between abutment 52 and ring 82. The liquid to be tested is heated to the desired temperature, say 180° F., and kept at that temperature during the test by controlling the temperature of the jacket water. The shaft 40 is rotated at a predetermined speed, say 900 r. p. m., by suitably adjusting the driving belt on the cone pulleys and controlling the speed of the motor. Thus races 56 and 74 rotate at the speed of the shaft causing balls 60 and 72 to planetate and at the same time to apply a friction drag to races 62 and 70 in the same direction. The torque reaction of races 62 and 70 is transmitted to the balls 66 and thru them to member 64 and its arm 68 which in turn acts against the spring 106 on the staff of the torque measuring instrument G, thus giving a reading which can be taken as a measure of the frictional loss over the contact areas between the balls and races. The disposition of member 64, races 62 and 70 separated by balls 66, permitting slight horizontal movement and self-adjusting capacity, insures correct alinement of races and compensates for slight relative eccentricities of the raceways. Obviously, the balls of the ball thrust bearings constantly change their directions of travel during operation and therefore have, under load, a spinning or rubbing contact with the races as they roll on them, which is the same in kind as the spinning contact of rollers with races in friction transmission mechanism of the hard race and roller type referred to. The results of tests on oils or other liquids made with this apparatus have been found to give sufficiently accurate information to serve as guides to the selection of oils suitable to be used in said friction transmission mechanisms for giving adequate lubrication and cooling of the parts in rubbing contact due to spinning and yet afford tractive adhesion whereby power may be transmitted without scoring or tearing the contact surfaces of races and rollers.

Having described one embodiment of my invention and the mode of operating it, what I claim is:

1. In apparatus for testing lubricants, the combination of a container for liquid; an upright shaft rotatable therein; means for rotating the shaft at predetermined speeds; a lower abutment on the shaft; a lower ball thrust bearing comprising a driving race centered on the shaft and resting on the abutment; an upper ball thrust bearing comprising a driving race centered on the shaft; adjustable pressure means mounted to rotate with the shaft and bearing against the upper driving race; a torque transmitting member disposed between said ball thrust bearings, said member having a plurality of ball seats and balls in said seats in contact with the inner races of both thrust bearings, and an arm extending to the exterior of the container; a spring for resisting movement of the arm in the direction of rotation of the shaft, and means to measure the torque on said member due to friction between the inner races and balls in said torque transmitting member.

2. In apparatus for testing lubricants, the combination of a shaft, two axially spaced ball thrust bearings surrounding the shaft, each bearing consisting of two grooved races separated by balls engaging the grooves, the two end races being centered accurately by snug engagement with the shaft and the two intermediate races being loosely sleeved over the shaft so as to be capable of limited movement transversely of the shaft axis, a ring interposed between the two intermediate races, means for applying axial force to the end races tending to cause them to approach one another, and means for measuring the torque on said interposed ring.

3. In apparatus for testing lubricants, the combination of a shaft, two axially spaced thrust bearings coaxial with the shaft, each bearing composed of two races and interposed rollers, means tending to force the end races toward one another and into strong frictional engagement with the shaft, the intermediate races being loosely sleeved over the shaft, a ring interposed between said intermediate races in frictional engagement therewith, means for measuring the torque exerted upon said ring; said means tending to force the end races toward one another comprising an adjustable abutment on the shaft, a ring spaced from the abutment bearing upon one of the end races, and a plurality of spring washers surrounding the shaft between said adjustable abutment and ring.

JOHN O. ALMEN.